United States Patent [19]

Orsborn et al.

[11] Patent Number: 5,025,614
[45] Date of Patent: Jun. 25, 1991

[54] CONTROL SYSTEM FOR A COTTON HARVESTER

[75] Inventors: Jesse H. Orsborn; Timothy L. Chambers, both of Hinsdale; John D. Watt, Naperville, all of Ill.

[73] Assignee: J. I. Case Company, Racine, Wis.

[21] Appl. No.: 497,194

[22] Filed: Mar. 22, 1990

[51] Int. Cl.⁵ .................... A01D 46/08; A01D 75/20
[52] U.S. Cl. ..................................... 56/10.2; 56/16.4; 56/28; 56/DIG. 15
[58] Field of Search ...................... 56/10.2, 12.8, 16.4, 56/28, 30, DIG. 7, DIG. 15

[56] References Cited

U.S. PATENT DOCUMENTS

| | | |
|---|---|---|
| 4,332,127 | 6/1982 | Staiert et al. ................ 56/DIG. 15 |
| 4,458,471 | 7/1984 | Herwig .............................. 56/10.2 |
| 4,466,230 | 8/1984 | Osselaere et al. ............ 56/DIG. 15 |
| 4,744,207 | 5/1988 | Hanley et al. ......................... 56/28 |
| 4,759,185 | 7/1988 | McConnell et al. ................ 56/10.2 |
| 4,896,491 | 1/1990 | Warnsholz et al. ..................... 56/28 |

Primary Examiner—Terry Lee Melius
Attorney, Agent, or Firm—Dressler, Goldsmith, Shore, Sutker & Milnamow, Ltd.

[57] ABSTRACT

A control system for operating one or more different mechanisms on a cotton harvester as a function of engine speed. The control system includes an apparatus for generating a speed signal representative of current engine operating speed and control circuitry connected to the apparatus for controlling operation of at least one and, preferably, a plurality of different mechanisms arranged on the harvester as a function of engine speed.

8 Claims, 4 Drawing Sheets

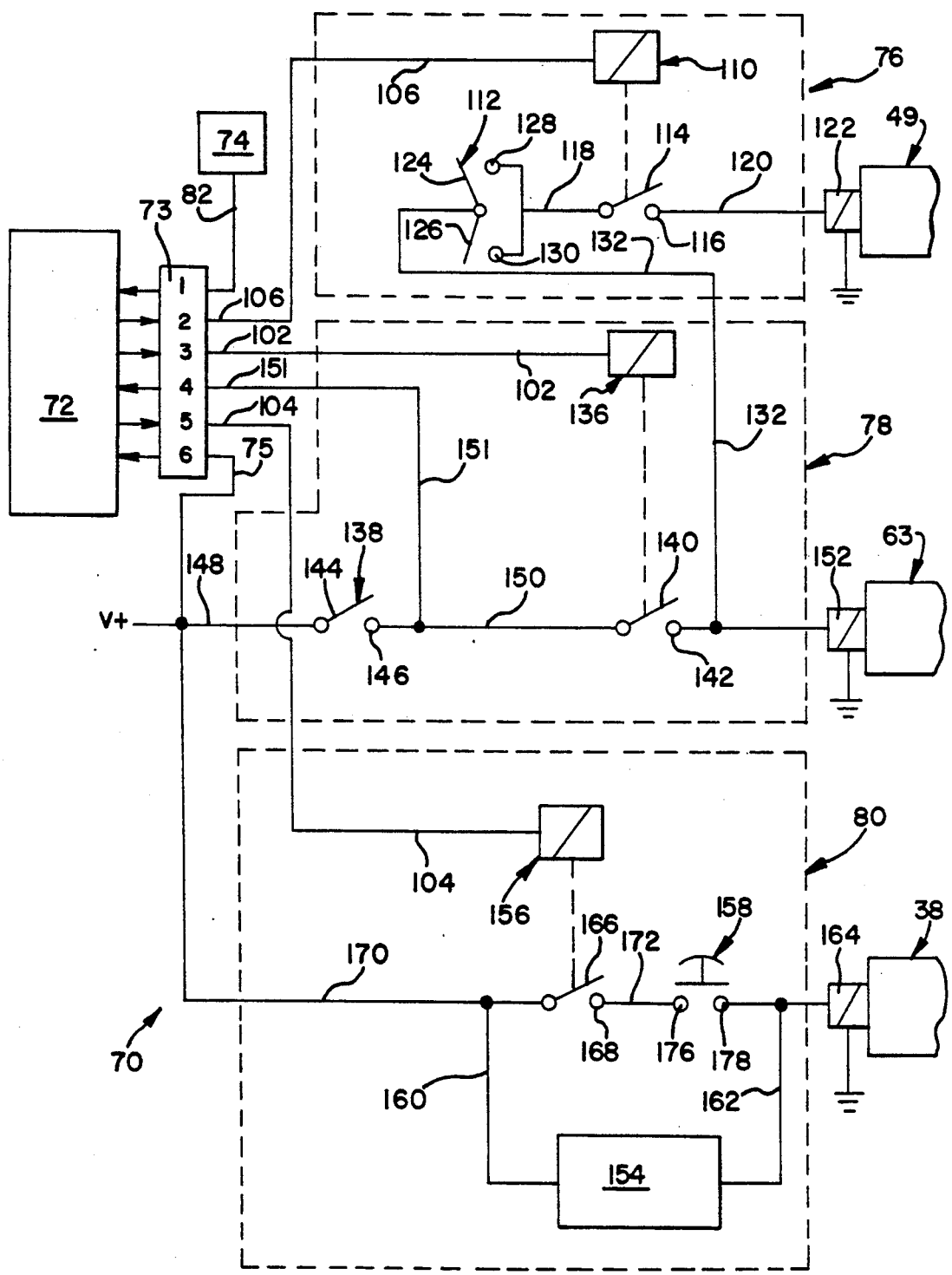
FIG_2

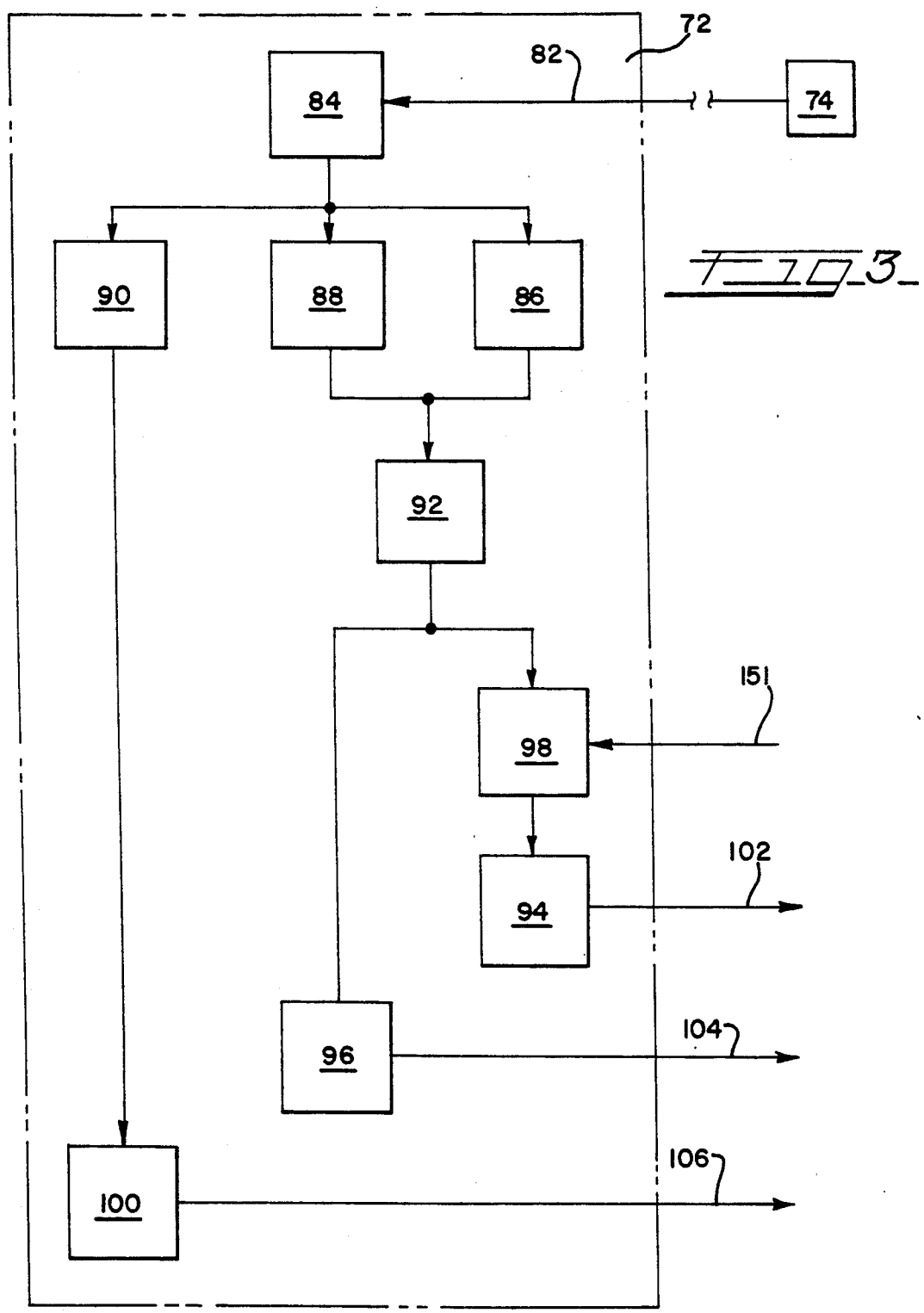

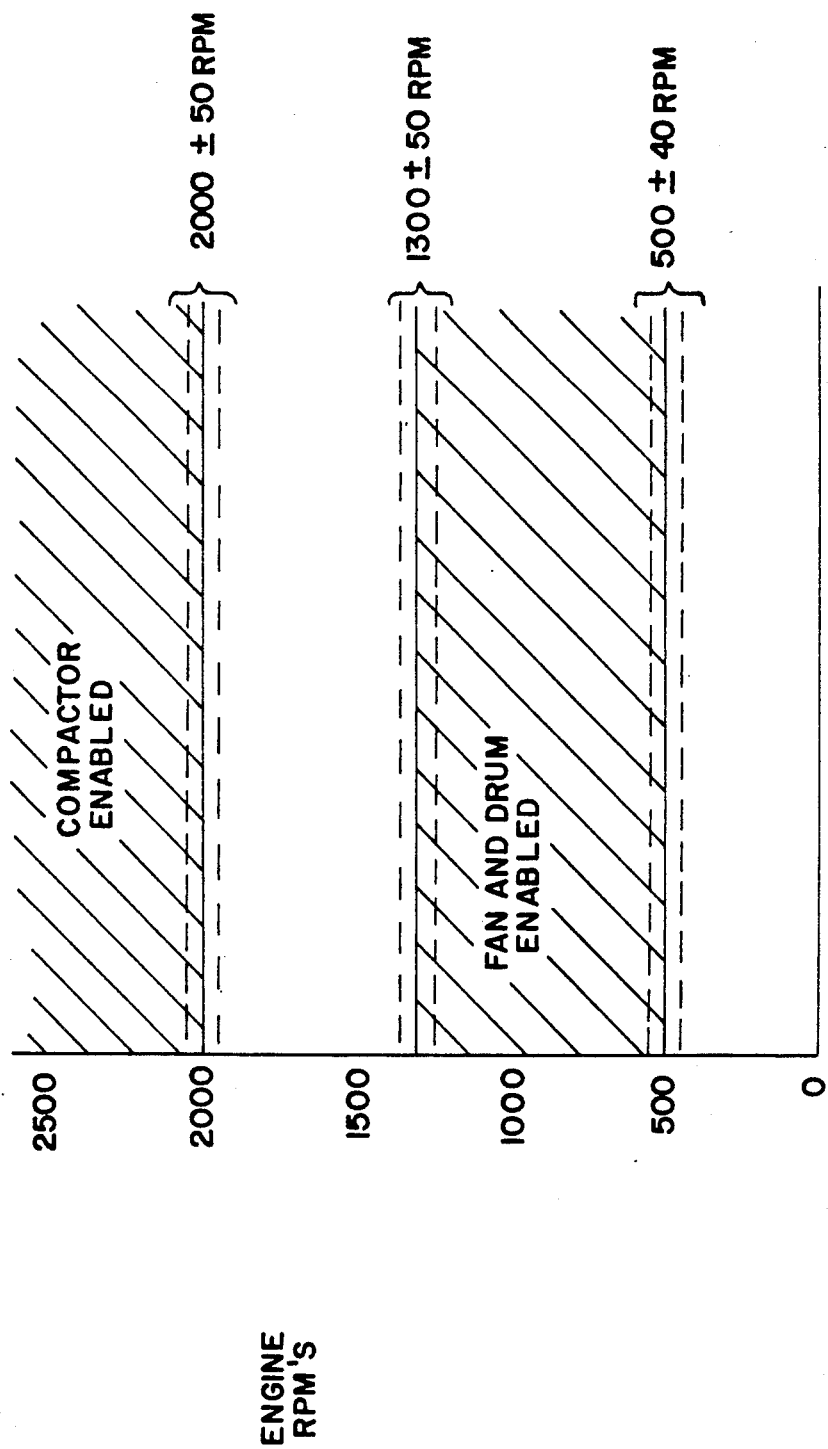

CONTROL SYSTEM FOR A COTTON HARVESTER

FIELD OF THE INVENTION

The present invention generally relates to cotton harvesters and, more particularly, to a system for controlling operation of various mechanisms on the harvester as a function of engine speed.

BACKGROUND OF THE INVENTION

A typical cotton harvester includes a series of different mechanisms which are driven by an engine. Although interrelated to effect a cotton harvesting operation, each mechanism is enabled at different ranges of engine speed to effect a specific function.

a conventional cotton harvester includes a series of harvesting units connected to a forward end of a frame. In a preferred form, each harvesting unit includes a harvesting mechanism for harvesting cotton from cotton plants as the harvester is moved over a field. The harvested cotton is conveyed through a duct system to a cotton receptacle. A fan mechanism provides a source of air which is sued to propel the cotton through the ducts and into the receptacle. Moreover, it is known to use a compactor mechanism within the receptacle for compressing the cotton and thereby increasing the capacity of the receptacle.

Many of today's harvesters include an operator presence system for controlling operation of the harvesting mechanism during normal harvesting operations. The operator presence system is provided to reduce exposure to the harvesting mechanism during harvester operation. A by-pass circuit incorporated into such a system, however, permits operation of the harvesting mechanism in a manner facilitating service and inspection thereof. As will be appreciated, the engine of the harvester, which ultimately is used to drive the harvesting mechanism, should be governed to limit engine speed during use of the by-pass circuit.

The fan mechanism develops an air flow within the harvester and includes a fan which is selectively connected to a continuous drive. In the illustrated embodiment, the continuous drive includes a belt loosely entrained about drive and driven pulleys. The drive pulley is rotated in response to engine operation. A fan interlock mechanism regulates the tension on the belt and thereby selectively controls fan operation.

As will be understood, there is both a need and desire to operate the fan mechanism within a predetermined range of engine speeds. Understandably, there is quite a shock to the harvester if the fan mechanism is initially engaged at a higher range of engine speeds. Therefore, it is desirable to engage the fan mechanism when the engine idles or within a predetermined range of speeds which is a predetermined percentage of normal engine idle speed. Because the drive pulley of the continuous drive is driven from the engine, disengagement of the fan mechanism at relatively high engine speed is likewise undesirable. Belt wear, breakage and other problems typically result from disengagement of the fan mechanism at high engine speeds.

The compactor mechanism of the harvester compresses cotton within the receptacle and thereby enhances capacity of the receptacle. The compactor mechanism typically operates at a high range of engine speeds when the cotton flow to the receptacle is maximized. It is desirable, therefore, to disable the compactor mechanism in a low range of engine speeds when it is not essential to harvester operation and to not draw needed energy and performance from other mechanisms on the cotton harvester.

Heretofore known cotton harvesters have a relatively complicated system for enabling and disabling different mechanisms on the harvester. One such system includes a myriad of microswitches and linkages which usually operate as a function of the engine throttle position. Operators of the cotton harvester have been known to successfully override or bypass the known systems by quickly engaging the microswitches. The ability to override the system, however, also typically results in wear and tear on the belts and/or other power transfer mechanisms used to operate the different mechanisms on the cotton harvester.

Because the harvesting season is relatively short, the operator does not want to spend valuable time replacing belts and repairing other devices to continue the harvesting operation. Another problem with linkages and microswitches involves their adjustability. As will be appreciated, each of the linkages and microswitches used to operate the different mechanisms need to be physically adjusted to achieve the desired operating range within which the different mechanisms operate. Moreover, the addition of microswitches and linkages to the harvester to control operation of the different mechanisms also increases the cost of the harvester and the complexity thereof.

SUMMARY OF THE INVENTION

In view of the above, and in accordance with the present invention, there is provided a relatively simple system for enabling more than one and, preferably, a plurality of different mechanisms on a cotton harvester as a function of engine speed. The control system of the present invention includes an apparatus for generating a signal indicative of current engine operating speed and control circuitry connected to the apparatus for controlling operation of one or more mechanisms arranged on the harvester as a function of engine speed.

The cotton harvester includes a mobile frame which is moved across a field by a power train including an engine. The cotton harvester further includes a plurality of different mechanisms which are operated at different engine speeds. In the illustrated embodiment, the cotton harvester is illustrated as having a harvesting mechanism arranged at a forward end of the cotton harvester, a fan mechanism, and a compactor mechanism. Preferably, each of the mechanisms arranged on the harvester are electro/hydraulically operated as a function of engine speeds.

The harvesting mechanism is comprised of a plurality of harvesting units supported for vertical movement at the forward end of the harvester. In the illustrated embodiment, each harvesting unit includes a pair of picker rotors for picking cotton from the plants. The picker rotors are driven in timed relation with movement of the harvester across the filed. The cotton picked from the plants is conveyed from the harvesting units through a duct system to a receptacle.

The fan mechanism provides a source of air which is used to propel the picked cotton into the receptacle. The fan mechanism includes a fan interlock mechanism which operates a fan within a predetermined range of engine speeds.

The compactor mechanism includes a reciprocal compactor within the receptacle for compressing the cotton received within the receptacle and thereby enhancing capacity of the receptacle. The compactor is reciprocally driven by a compactor drive mechanism. The compactor drive mechanism may be operated in either an Automatic or Manual mode and, in a preferred embodiment, is enabled when the fan interlock mechanism engages the fan.

The control system of the present invention controls operation of more than one and, preferably, a plurality of various mechanisms on the harvester as a function of engine operating speeds. The control system of the present invention includes a control module which is configured to receive engine sped signal inputs from an engine speed sensor and generates outputs which regulate operation of compactor circuitry, fan interlock circuitry, and harvesting unit operation circuitry.

The fan interlock circuitry of the control system enables the fan interlock mechanism when the engine speed operates between a predetermined lower limit or threshold and a predetermined upper limit or threshold. When the engine operates at a speed less than the lower threshold, the fan interlock circuitry disables the fan interlock mechanism. The main purpose of the lower constraint is to protect against a faulty or misadjusted engine speed sensor. Because the engine normally idles well above the lower threshold, the lower engine speed threshold should never be a factor except in the case of a faulty or misadjusted sensor.

When the engine operates at a speed above the upper limit set for fan operation, the fan interlock circuitry maintains the fan interlock mechanism in the state it was before rising above the upper engine speed limit. The upper constraint on enablement of the fan interlock mechanism has been established as the high limit on engine speed to engage and disengage the fan interlock mechanism in a manner inhibiting damage to the continuous drive mechanism for operating the fan.

The harvesting unit operation circuitry of the control system includes an operator presence system which is used during normal operation of the harvester. The harvesting unit operation circuitry further includes a service by-pass circuit, arranged in parallel with the operator presence system, to facilitate inspection and service of the harvesting units. The service bypass circuit includes a remote switch. The service bypass circuit enables operation of the harvesting units when the engine speed is above a predetermined lower threshold or limit and beneath a predetermined upper threshold or limit.

As with the fan interlock mechanism, the lower constraint on engine speed for operating the harvesting units through the service bypass circuit is to protect against a faulty or misadjusted engine speed sensor and to ensure that the engine speed sensor is working. The upper constraint for enabling operation of the harvesting units through the service bypass circuit has been established as the high limit on engine speed to advance the picker rotors for inspection and/or servicing.

The compactor circuitry of the control system regulates operation of the compactor mechanism as long as the engine speed rises above a predetermined engine speed threshold or level. The threshold for operating the compactor mechanism was established as a low limit on engine speed that the operator would be harvesting and need the compactor. In the preferred embodiment, the compactor circuitry furthermore conditions enablement of the compactor mechanism to when the fan interlock mechanism is engaged and the compactor drive mechanism is either operated in an Automatic or Manual mode of operation.

In a preferred form, the fan interlock circuitry of the control system further includes a bypass apparatus which enables the fan interlock mechanism in the event of engine speed sensor failure. To promote replacement of a faulty or failed engine speed sensor, the control system of the present invention is configured such that the compactor mechanism and service by-pass circuit are both disabled when the by-pass apparatus provided by the fan interlock circuitry is used to enable the fan interlock mechanism. Accordingly, the operator will be permitted limited use of the harvesting mechanism at normal operating speed to finish a short harvesting operation but will have to eventually correct the sensor problem to enable compactor operation and servicing of the harvesting units.

The control system of the present invention eliminates the microswitch and linkages heretofore known for controlling the different mechanisms on the harvester. Elimination of the microswitches and linkages simplifies controlling the various mechanisms on the harvester and reduces the number of parts used to control harvester operation. Elimination of the microswitches and linkages furthermore eliminates the need to physically adjust parts to achieve the desired control over operation of the different mechanisms. The ability to monitor or sense engine speed also avoids operator's attempts to override or bypass the system thereby achieving maximum use and life from the belts and other devices used to drive the operating mechanisms.

Numerous other advantages and features of the present invention will become apparent from the following detailed description, the accompanying drawings, and the appended claims.

IN THE DRAWINGS

FIG. 2 is a schematic representation of a control system used in combination with the cotton harvester for controlling operation of the different operating mechanisms as a function of engine speed;

FIG. 3 is a block diagram of a control module forming part of the control system illustrated in FIG. 2;

FIG. 4 is a graphical representation of the preferred range of engine speeds during which various mechanisms on the harvester are operated for maximum performance;

Figure 6:
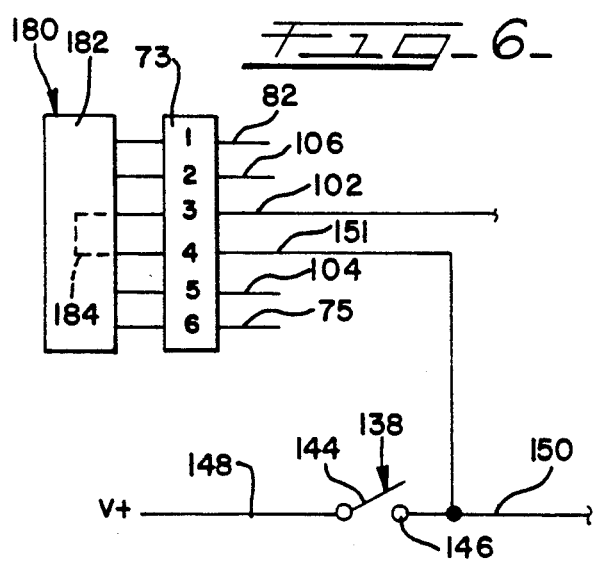
Figure 5:
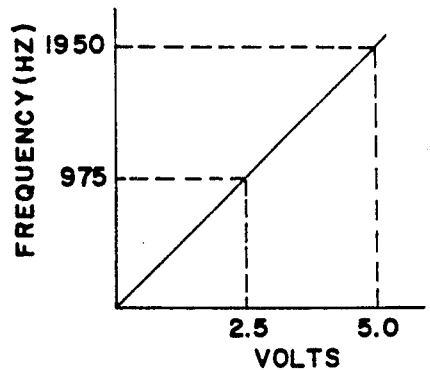

FIG. 5 graphically represents an exemplary defined association between frequency and voltage used in the present invention; and FIG. 6 is a fragmentary schematic representation of a by-pass apparatus used in combination with the control system illustrated in FIG. 2.

DETAILED DESCRIPTION OF THE INVENTION

While the present invention is susceptible of embodiment in various forms, there is shown in the drawings, and will hereinafter be described, a preferred embodiment of the invention with the understanding that the present disclosure is to be considered as an exemplification of the invention and is not intended to limit the invention to the specific embodiment illustrated.

Figure 1:
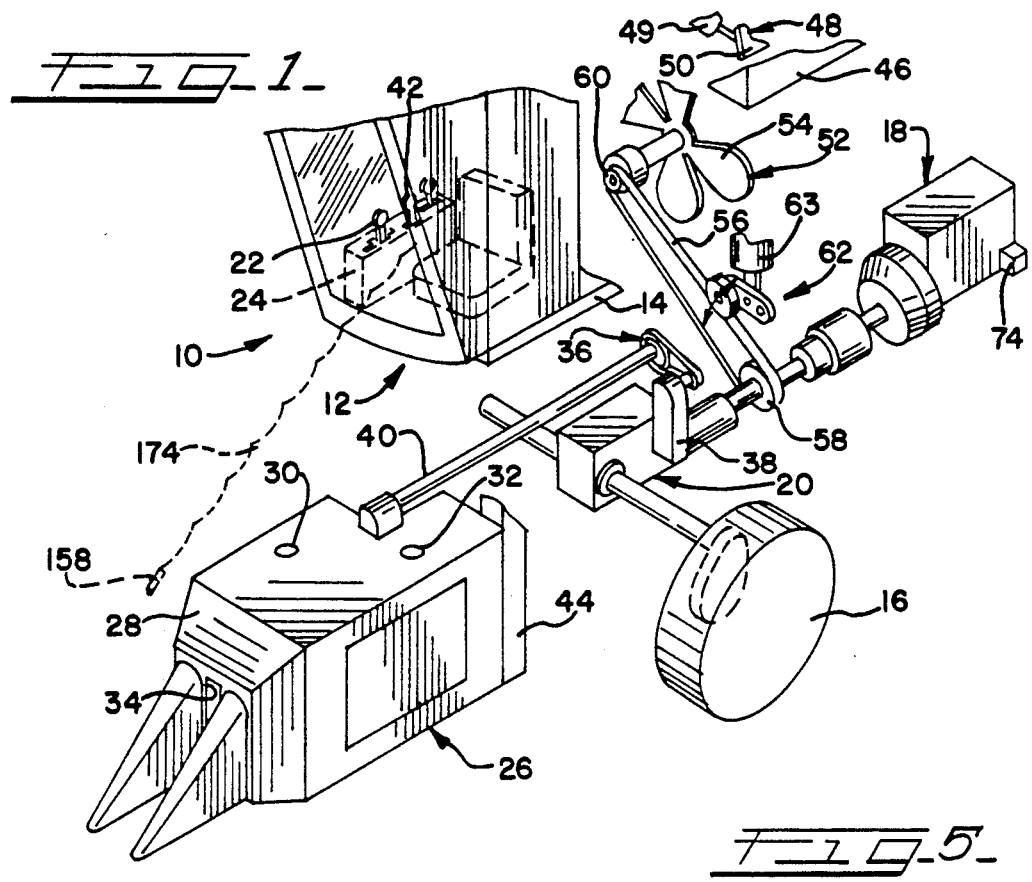
FIG. 1 is a schematic representation of a cotton harvester with different operating mechanisms arranged thereon.

Referring now to the drawings, wherein like reference numerals indicate like parts throughout the several views, there is shown a cotton harvester which is depicted only fragmentarily and is seen as represented in its entirety in FIG. 1 by reference numeral 10. The cotton harvester 10 includes an operator station 12 arranged at a forward end of a mobile self-propelled chassis or frame 14. The frame 14 is supported for movement over a cotton field by wheels 16. A power train including an engine 18, which is operated from the operator station 12 at different speeds in response to operator controls, and a transmission 20 supply motive power to the wheels 16. The transmission 20 is shiftable from a neutral or park position into a plurality of gear ratios. As illustrated, a gear shift lever 22 arranged on a control console 24 at the operator's station 12 conditions the transmission 20 for operation.

Although only one is illustrated in FIG. 1, harvester 10 preferably includes a plurality of harvesting units 26 supported for vertical movement at a forward end of the harvester. Each harvesting unit includes a housing 28 having a conventional harvesting mechanism for harvesting cotton from plant rows as the harvester is driven through the field. In the illustrated embodiment, the harvesting mechanism of each harvesting unit typically includes a pair of picker rotors 30 and 32 arranged alongside a plant passage 34 defined by housing 28.

The picker rotors of each harvesting unit are operably driven by a harvesting unit drive mechanism 36 including a hydrostatic drive apparatus 38 connected to and driven in timed relation with the transmission 20 such that the picker rotors are driven at a speed proportional to the speed of the wheels 16. The hydrostatic drive apparatus 38 is connected to the picker rotors through a drive shaft 40 and is controlled by a shiftable control lever 42 arranged on the control console 24.

Each harvesting unit 26 further includes suitable duct structure 44 for conveying cotton harvested by the harvesting unit to a suitable receptacle 46 preferably mounted on the frame 14.

As shown fragmentarily in FIG. 1, a compactor mechanism 48 is mounted within the receptacle 46. As illustrated, compactor mechanism 48 includes a suitable compactor drive mechanism 49 arranged in association with an open frame compactor 50 adapted for reciprocal movement within the receptacle 46 in a manner compacting or compressing the cotton therewithin and thereby increasing the effective capacity of the receptacle. In a preferred form, drive mechanism 49 includes a pair of fluid responsive and linearly distensible drives. In a most preferred form, the drivers are pneumatically operated but it is also possible to hydraulically operate the drivers.

As is conventional, harvested cotton is drawn into the duct structure 44 and positively propelled toward receptacle 46 under the influence of a fluid jet stream which is commonly air. A suitable fan mechanism 52 is mounted on the frame 14 for developing a suitable air flow. In the illustrated embodiment, fan mechanism 52 includes a fan 54 which si intermittently driven by a continuous drive apparatus. In the illustrated embodiment, the continuous drive apparatus includes a belt 56 which is loosely entrained over drive and driven pulleys 58 and 60, respectively. A fan interlock mechanism 62 including a tensioner 63 regulates the transfer of power to the fan 54 by tensioning the belt 56 and thereby transferring power between the drive and driven pulleys 58 and 60, respectively.

In accordance with the teachings of the present invention, FIG. 2 schematically represents an example of a control system 70 for controlling operation of the various mechanisms as a function of engine speed. In its illustrated form, the control system 70 regulates operation of the hydrostatic drive apparatus 38 for the harvesting unit drive mechanism 36 (FIG. 1), the drive mechanism 49 for the compactor mechanism 48 (FIG. 1), and the fan interlock tensioner 63 of the fan mechanism 52 (FIG. 1) either independently of each other or in combination with each other and as a function of engine speeds.

As illustrated in FIG. 2, the control system 70 includes a control module 72 which, through a conventional pin-type plug-in connector 73, is connected to an engine speed sensor 74, to a voltage source V+, such as a battery, over line 75, and to compactor circuitry 76, fan interlock circuitry 78, and harvesting unit operation circuitry 80. In the preferred design the control module 72 has an analog design.

The engine speed sensor 74 may be of any known type for generating a signal proportional to the speed of the engine 18 (FIG. 1). In the preferred design, the sensor 74 produces a frequency signal as a function of engine speed and which is delivered over line 82 to control module 72.

The control module 72 is configured to receive inputs from the engine speed sensor 74 and generate outputs used to enable or control the compactor circuitry 76, fan interlock circuitry 78 and harvesting unit operation circuitry 80 as a function of engine speed. As illustrated in FIG. 3, the control module 72 includes a frequency to voltage converter 84 which is connected to speed sensor 74 over line 82. The voltage output of converter 84 is delivered to a 500 rpm comparator 86, a 1300 rpm comparator 88, and a 2000 rpm comparator 90. The outputs of comparators 86 and 88 are delivered to a gate 92. The output of gate 92 is delivered to relay drivers 94 and 96. In the illustrated embodiment, the output of gate 92 delivered to relay driver 94 also serves as an input signal to fan interlock logic circuitry 98. The output of comparator 90 is delivered to relay driver 100.

The output of relay driver 94 is delivered over line 102 and is used to enable operation of the fan interlock circuitry 78. The output of relay driver 96 is delivered over line 104 and is used to enable operation of the harvesting unit operation circuitry 80. The output of relay driver 100 is delivered over line 106 and is used to enable operation of the compactor circuitry 76.

All of the relay driver outputs are short circuit protected. If any relay driver gets shorted to ground, the protection would be initiated and the function latched OFF until the function was turned OFF and then back ON. The function will be latched OFF again if the short still remains.

Returning to FIG. 2, the compactor circuitry 76 includes a compactor operation relay 110 and a manually operated compactor switch 112 which are connected in series relative to each other. Relay 110 is connected and operates in response to output signals generated by the relay driver 100 (FIG. 3) of the control module 72 and delivered over line 106. As illustrated, the relay 110 includes a movable contact 114 and a normally open contact 116. The movable contact 114 is connected over line 118 and in series with the manually operated switch 112 preferably located at the operator's station 12 (FIG. 1) of the harvester. The normally open contact 116 of relay 110 is connected over line 120 to an electrically operated solenoid 122 adapted to control operation of the drive mechanism 49 of the compactor mechanism 48.

Compactor switch 112 of compactor circuitry 76 is illustrated as a 2-pole double throw switch with a neutral or off position and has movable contacts 124 and 126 which are illustrated in a neutral or normally open position. Compactor switch 112 also includes a fixed "Automatic" contact 128 and a fixed "Manual" contact 130 for effecting either "Automatic" or "Manual" operation of the compactor drive mechanism 49. Compactor switch 112 is connected over line 132 to the fan interlock circuitry 78.

As illustrated in FIG. 2, the fan interlock circuitry 78 includes a fan operation relay 136 and a two-position manually operated fan switch 138 which are connected in series relative to each other. Relay 136 is connected and operates in response to output signals generated by the relay driver 94 (FIG. 3) of the control module 72 and delivered over line 102. As illustrated, the relay 136 includes a movable contact 140 and a normally open contact 142.

As illustrated, the manually operated fan switch 138 includes a movable contact 144 and a fixed normally open contact 146. The movable contact 144 is connected to the voltage source or battery over line 148. The fixed normally open contact 146 of fan switch 138 is connected over line 150 to the movable contact 140 of relay 136. For purposes to be discussed in detail hereinafter, the normally open contact 146 of fan switch 138 is also connected over line 151 to the fan interlock logic circuitry 98 (FIG. 3) of the control module 72. The normally open contact 142 of relay 136 is connected to an electrically operated solenoid 152 which controls operation of the tensioner 63 of the fan interlock mechanism 62. Line 132 leading from the manually operated switch 112 of the compactor circuitry 76 is also connected to the normally open contact 142 of relay 136.

As further illustrated in FIG. 2, the harvesting unit operation circuitry 80 comprises an operator presence system 154 and a service by-pass circuit including an operation relay 156 and a remote switch 158. The operator presence system 154 is configured to operate the harvesting unit drive mechanism and thereby the harvesting units from the operator station 12 of the harvester. As illustrated in FIG. 2, the operator presence system 154 operates the harvesting units under normal operating or harvesting conditions and is arranged in parallel with the service by-pass circuit including relay 156 and remote switch 158. The operator presence system 154 is connected to the voltage source V+ over line 160 and, over line 162, to an electrically operated solenoid 164 which controls operation of the hydrostatic drive apparatus 38 of the harvesting unit drive mechanism and thereby regulates operation of the harvesting units.

Relay 156 of the service by-pass circuit is connected and operates in response to output signals generated by the relay driver 96 (FIG. 3) of control module 72 and delivered over line 104. As illustrated, the relay 156 includes a movable contact 166 and a normally open contact 168. The movable contact 166 of relay 156 is connected over line 170 to the voltage source. The normally open contact 168 of relay 156 is connected over line 172 to remote switch 158.

In a preferred form, remote switch 158 is designed as a tether switch. In a most preferred form, remote switch 158 is a normally open push-button switch which, as illustrated in FIG. 1, is connected as by a tether 174 to the harvester 10. Alternatively, remote switch 158 can be suitably secured to the housing 28 of a harvesting unit to facilitate manual actuation of the picker rotors from outside the operator station.

Returning to FIG. 2, one open contact 176 of remote switch 158 is connected to the normally open contact 168 of relay 156 over line 172. The other open contact 178 of remote switch 158 is connected over line 180 to the electrically operated solenoid 164 which controls operation of the drive apparatus 38 of the harvesting unit drive mechanism.

The harvesting unit drive mechanism 36, compactor mechanism 48, and fan interlock mechanism 62 are each operable within a predetermined range of engine speeds. To facilitate inspection and servicing of the harvesting units, the service by-pass circuit of the harvesting unit operation circuitry 80 enables operation of the harvesting units under the control of the remote switch 158 when the engine 18 operates above and below predetermined threshold levels. Similarly, the fan interlock circuitry 78 enables operation of the fan interlock mechanism 62 when the engine 18 is operated within a predetermined range of speeds to inhibit damage to the fan mechanism 52. Moreover, the compactor circuitry 76 enables operation of the compactor drive mechanism 49 during that range of engine speeds when the operator would be harvesting cotton and needs the compactor mechanism 48 to operate.

As an example of the above, control system 70 inhibits the fan mechanism 52 from operating if the engine speeds are in excess of an upper threshold or engine speed limit and yet allows engagement of the fan mechanism 52 without having to shut off the engine. Because the compactor mechanism 48 is normally required only during harvesting operations, the control system 70 establishes a predetermined threshold on engine speed for enabling the compactor circuitry 76. Such threshold level inhibits operation of the compactor mechanism 48 until a predetermined engine speed has been achieved. Similarly, the service by-pass circuit of the harvesting unit operation circuitry 80 of the control system 70 governs operation of the harvesting units under the control of the remote switch 158 to a predetermined range of engine speeds.

As will be appreciated, the illustrated ranges between the predetermined threshold levels which have been set for use with the present invention are exemplary and are not meant to limit the invention to the particular ranges set forth. Advantageously, the control system 70 of the present invention permits the threshold levels for the various mechanisms to be set as may be required to achieve optimum performance of the harvester.

Turning now to FIG. 4, and as an example of threshold levels used with the present invention, the control system 70 enables operation of the compactor mechanism 48 as long as the engine operates above about 2000 rpm's. When the engine operates at speeds less than about 2000 rpm, the control circuitry 70 disables the compactor mechanism 48. The 2000 rpm threshold or limit was established as the low limit on engine speed that the operator would be harvesting and need the compactor.

The control system 70 enables operation of the fan mechanism 52 as long as the engine operates at speeds between about 500 and about 1300 rpm's. When the engine 18 operates below the lower threshold of about 500 rpm, the fan interlock circuitry 78 disables the fan interlock mechanism 62, thereby disabling the fan mechanism 52. The main purpose of the lower threshold is to protect against a faulty or misadjusted engine speed sensor 74. Notably, the engine normally idles at about 950 rpm, thus, the lower threshold for enabling operation of the fan mechanism 52 should not be a factor except in the case of a faulty or misadjusted speed sensor.

The upper threshold or limit of about 1300 rpm has been established as an upper limit on engine speed allowing engagement or disengagement of the fan interlock mechanism 62 in a manner diminishing the likelihood of damage to the fan mechanism 52 because of engine speed. Notably, the fan interlock logic circuitry 98 within the control module 72 allows the fan interlock mechanism 62 to remain in the state it was before the engine speed rose above the 1300 rpm threshold.

The harvesting unit operation circuitry 80 of the control system 70 is provided with the service by-pass circuit to allow conditional operation of the harvesting units for inspection and servicing. The harvesting unit operation circuitry 80 enables operation of the harvesting unit drive mechanism under the influence of remote switch 158 when the engine speed is greater than about 500 and less than about 1300 rpm. When the engine operates below the lower threshold of about 500 or above about 1300 rpm, the drive operation circuitry 80 disables operation of the harvesting unit drive mechanism under the control of the remote switch 158. The main purpose of the lower threshold is to protect against a faulty or misadjusted speed sensor 74. The upper threshold or limit of 1300 rpm has been established as the high limit on engine speed to operate the harvesting units under the remote switch 158 for servicing or inspection.

During operation of the harvester 10, the speed sensor 74 provides a frequency signal representative of the current operating speed of the engine 18 to the control module 72 over line 82. The frequency signal input from the engine speed sensor 74 is received by the converter 84 and is converted to a voltage output as a function of a defined frequency/voltage relation created externally to the converter 84.

FIG. 5 schematically represents the frequency/voltage relation used by the converter 84. The frequency/voltage relation used by the converter 84 defines the threshold voltages for the 500 rpm comparator 86, the 1300 rpm comparator 88, and the 2000 rpm comparator 90. During operation of the harvester 10, the output voltage of the converter 84 is compared to the threshold voltage of each comparator 86, 88 and 90. When the threshold voltage of a comparator is exceeded, the output of the respective comparator changes state, either from HIGH to LOW or from LOW to HIGH, depending on the application.

The gate 92 of control module 72, which receives inputs from comparators 86 and 88, is preferably an AND function gate. In the preferred form, the output of the AND function gate 92 is HIGH when the output voltages of the converter 84 is between the threshold voltages of the 500 rpm comparator 86 and the 1300 rpm comparator 88. The outputs of both comparators 86 and 88 would be HIGH in this state.

When the output of the AND function gate 92 is HIGH, it enables the fan interlock logic circuitry 98 such that the operator can turn the fan mechanism 52 ON and OFF. When the fan interlock logic circuitry 98 is enabled and the fan switch 138 is closed (turned ON), the fan interlock logic circuitry 98 provides a signal to the relay driver 94 which energizes the operation relay 136 of the fan interlock circuitry 78 over line 102.

Energizing relay 136 causes the movable contact 140 to close the normally open contact 142. When the operator closes the fan switch 138, a circuit is completed between the voltage source and the electrically operated solenoid 152 to operate the tensioner 63 of the fan interlock mechanism 62 and thereby enable operation of the fan mechanism 52.

When the output of the AND gate 92 is LOW (indicative of the output voltage of the converter 84 being outside the threshold voltages of comparators 86 and 88), the fan switch 138 can be manually moved without any operational effect on the fan mechanism 52. There will be no operational effect on the fan mechanism 52 because the fan interlock logic circuitry 98 is not enabled.

The provision of a HIGH output signal from the AND gate 92 is indicative of engine operation between about 500 and about 1300 rpm's. Therefore, the provision of a HIGH output signal from the AND gate 92 ensures that engine 18 is operating within a range of speeds wherein the operating condition for the harvesting units can be operated as with the remote switch 158.

As mentioned above, the provision of a HIGH output signal from the AND gate 92 is delivered to relay driver 96 which energizes operation relay 156 of the service by-pass circuit of the harvesting unit operation circuitry 80 over line 104. Energizing relay 156 of the service by-pass circuit causes the movable contact 166 to close the normally open contact 168. When the remote switch 158 is closed, a circuit is completed between the voltage source V+ and the electrically operated solenoid 164 thereby regulating operation of the hydrostatic drive apparatus 38 of the harvesting drive mechanism 36 under the influence of the remote switch 158. As will be appreciated, the closure of the normally open relay contact 168 and remote switch 158 acts to bypass the operator presence system 154 which is arranged in parallel therewith.

When the engine speed rises above about 1300 rpm, the output of the AND gate 92 switches and the relay driver 96 (FIG. 3) de-energizes relay 156 of the service by-pass circuit thereby removing the contact 166 from the normally open contact 168. Accordingly, the remote switch 158 is inhibited from operating the hydrostatic drive apparatus 38 of the harvesting drive mechanism 36 and the harvesting units are normally operated under the control of the operator presence system 154.

When the engine speed rises above about 2000 rpm, the output voltage of the converter 84 exceeds the threshold voltage of the 2000 rpm comparator 90. When the threshold voltage of comparator 90 is exceeded, an output signal is delivered to relay driver 100 which energizes the operation relay 110 of compactor circuitry 76 over line 106. Energizing relay 110 causes the movable contact 114 to close the normally open contact 116.

As mentioned above, when the engine 18 of the harvester 10 is operated between about 500 and about 1300 rpm, relay 136 is energized in a manner closing the normally open contact 142. Thereafter, the manually operated fan switch 138 may be closed to complete a circuit between the voltage source V+ and the solenoid 152 for enabling operation of the fan mechanism 52.

In its preferred form, the control system 70 is designed such that the compactor mechanism 48 is enabled after the fan interlock mechanism 62 is engaged and the compactor switch 86 is in either an Automatic or Manual mode of operation. To effect such ends, in the illustrated embodiment, the contact 142 of the fan interlock circuitry 78 is connected, as by line 132, to the compactor switch 112 of the compactor circuitry. Accordingly, the compactor mechanism 48 is operated only after a circuit is completed between the voltage source, across manually operated switch 138 and closed relay 136 to the compactor switch 112. Thus, when the compactor switch 112 is moved into contact with either fixed contact 128 or 130, the solenoid 96 is energized thereby enabling operation of the compactor drive mechanism 49.

Notably, the fan interlock logic circuitry 98 within the control module 72 allows the fan interlock mechanism 62 to remain in the state it was before the engine speed rose above the 1300 rpm threshold. To effect such ends, the logic circuitry 98 of the control module 72 performs three functions. One function of the logic circuitry 98 involves determining the operational state of fan operation relay 136. A second function of the logic circuitry involves determining in what operational state the operator of the harvester wants the fan operation relay 136 to be in as determined by the position of fan switch 138. A third function of the logic circuitry involves determining whether the engine 18 of the harvester 10 is operating within a predetermined range of speeds.

Although the output of the AND gate 92 is LOW when the engine speed rises above about 1300 rpm, an input signal is delivered over line 151 to the fan interlock logic circuitry 98 (FIG. 3) of control module 72 reflective of the state of fan switch 138. The fan interlock logic circuitry 98 within control module 72 thereafter regulates energization of the fan operation relay 136 in response to the signal received over line 151. When the fan switch 138 is closed before the engine rises above about a 1300 rpm threshold, the fan interlock logic circuitry 98 maintains contact 142 of relay 136 closed even after the engine speed exceeds the 1300 rpm threshold so as to enable operation of the compactor mechanism 48.

The control system 70 of the present invention further provides for continued operation of the fan mechanism 52 for a limited time period despite the presence of a failed engine speed sensor 74. To enable continued operation of the harvester fan mechanism 52, and thereby extend operation of the harvester, despite a faulty or failed engine speed sensor 74, a by-pass apparatus 180 (FIG. 6) is provided in conjunction with the fan interlock circuitry 78. As schematically illustrated, the by-pass apparatus 180 includes a conventional plug-in connector 182 which is suitably mounted on the harvester and into which the pin-type connector 73 may be releasably plugged. The connector 182 includes a series of blind receptacles into which pins on the connector 73 may be inserted. The connector 182 further includes suitable connection means 184 which, after the connector 73 is plugged into the connector 182, electrically joins or connects lines 102 and 151. As will be appreciated, both connectors 73 and 182 are protected against fluid moisture and other contaminants, such as by a closure cap or the like.

The by-pass apparatus 180 enables operation of the fan mechanism 52 despite a faulty or failed engine speed sensor 74 by by-passing the control module 72. As mentioned, after the plug-in connector 73 is disconnected from the control module 72 and plugged into the by-pass apparatus 180, the connection 184 electrically joins the lines 102 and 151. Accordingly, when fan switch 138 is closed, voltage passes from the voltage source V+ over line 151, across the connection means 184 provided by connector 182 and to line 102. The voltage passing to line 102 is delivered to the fan operation relay 136 whereby closing the normally open contact 142. When coupled with closure of fan switch 138, the closure of the normally open contact 142 completes a circuit between the voltage source V+ and the solenoid 152 which controls operation of the tensioner 63 of the fan interlock mechanism 62.

To promote replacement of a faulty or failed engine speed sensor 74, the control system 70 is configured such that both the compactor circuitry 76 and the service by-pass circuitry of the harvesting unit operation circuitry 80 are disabled when the by-pass apparatus 180 is used to enable operation of the fan mechanism 52. In the illustrated embodiment, the connection means 184 in the connector 182 of the by-pass apparatus 180 connects lines 102 and 151. When the bypass apparatus 180 is utilized to enable operation of the fan mechanism 52, the operation relays 110 and 156 of the compactor circuitry 76 and service by-pass circuit of the harvesting unit operation circuitry 80, respectively, are effectively disconnected from the control module 72 whereby compressing the cotton within the receptacle by the compactor 48 and servicing of the harvesting units under the control of the remote switch 158 are inhibited.

Although the by-pass apparatus 180 allows continued operation of the fan mechanism 52 and, thus, continued operation of the harvester, such continued operation is limited in its duration. As the harvester continues to operate, the cotton is fed into the receptacle 46 but the compactor mechanism 48 is disabled thus the capacity of the receptacle 46 is limited. The limited capacity of the receptacle 46 causes the operator of the harvester to cease operation and correct that which is disabling operation of the compactor mechanism, namely the faulty sensor 74. Moreover, the inability to service the harvesting units under the control of the remote switch 158 furthermore promotes replacement of the sensor 74.

With the present invention, a single engine speed sensor 74 is combined with control circuitry to enable operation of different mechanisms at various engine speeds. As is apparent, the microswitches and linkages heretofore used for controlling the different mechanisms are eliminated thereby reducing the number of parts and the need to physically adjust the parts to achieve the desired control over operating the different mechanisms. The ability to monitor or assess engine speed also avoids operator's attempts to override the system. By avoiding attempts at overriding the system, the life of the conventional devices used to transmit power to the operating mechanisms will be maximized. Prolonging the life of the different belts and etc. used to transmit power, will furthermore reduce downtime for the harvester and maximize performance characteristics of the harvester.

This invention has been described in terms of a specific embodiment set forth in detail, but it should be understood that this is by way of illustration only and that the invention is not necessarily limited thereto. Modifications and variations will be apparent from the disclosure and may be resorted to without departing from the spirit of the invention, as those skilled in the art will readily understand. Accordingly, such variations and modifications of the disclosed products are considered to be within the purview and scope of the invention and the following claims.

What is claimed is:

1. A control system for a cotton harvester, said cotton harvester having a mobile frame driven across a field by an engine which is operated from an operator station at a plurality of speeds, a harvesting unit connected to the frame and including a harvesting unit drive mechanism for operating the harvesting unit, and a control system comprising:

means for generating a speed signal indicative of engine speed;

circuitry means for operating said harvesting unit drive mechanism and thereby said harvesting unit in a first operational mode from said operator station thereby reducing exposure to the harvesting mechanism while operating in said first operational mode; and circuitry means connected to said speed signal generating means for enabling operation of said harvesting unit drive mechanism and thereby said harvesting unit in a second operational mode under the influence of switch means remote from said operator station as long as said engine is operated within a predetermined range of speeds and for inhibiting operation of said harvesting unit in said second operational mode under the influence of said switch means by effectively disabling said harvesting unit drive mechanism when said engine speeds are beyond said predetermined range.

2. The control system according to claim 1 wherein said speed signal generating means includes means for monitoring engine speed, means connected to said monitoring means for determining whether said engine is operating within a predetermined range of speeds, and wherein said determining means enables operation of said circuitry means for enabling operation of said harvesting unit in a second operational mode.

3. A control system for a cotton harvester, said cotton harvester having a mobile frame driven across a field by an engine which is operated in a plurality of speeds, fan means carried by said frame, cotton harvesting means mounted on said frame for harvesting cotton, receptacle means mounted on said frame for receiving cotton from said harvesting means, and compactor means mounted within said receptacle means for compressing the cotton received in said receptacle means, said control system comprising:

speed sensor means for providing a speed signal indicative of engine speed;

control module means for receiving speed signals from said speed sensor means indicative of engine speed and generating output signals;

fan control circuitry means connected to and receiving said output signals from said control module means for enabling operation of said fan means when said engine is operated within a predetermined range of engine speeds and for disabling fan operation when said engine is operated outside of said predetermined range of engine speeds; and compactor control circuitry means connected to and receiving output signals from said control module means and said fan control circuitry means for enabling operation of said compactor means when said engine is operated above a predetermined speed and said fan control circuitry means enables fan operation.

4. The control system according to claim 3 wherein said control module means includes comparator means for determining said predetermined range of engine speeds, and logic circuitry means responsive to outputs from said comparator means for enabling fan operation when said engine is operated within said predetermined range of speeds.

5. The control system according to claim 4 wherein said logic circuitry means is further responsive to a two-position manually operated switch means included within said fan control circuitry means for enabling fan operation as a function of the position of said manually operated switch means when said engine speed rises above said predetermined range of engine speeds.

6. The cotton harvester according to claim 3 wherein said control system further includes by-pass means for enabling operation of said fan means when said engine operates at speeds outside said predetermined range while simultaneously disabling said compactor control circuitry means from enabling operation of said compactor means.

7. A control system for an agricultural implement having a mobile frame driven across a field under the influence of an engine which is operated in a plurality of speeds, and first and second controlled operational mechanisms carried by said frame, wherein said first and second controlled operational mechanisms are adapted to operate at predetermined engine speeds, said control system comprising:

means for generating signals indicative of engine speed; and control circuitry means connected to said signal generating means for enabling operation of said first and second controlled operational mechanisms within said predetermined range of engine speeds and for inhibiting operation of said first and second controlled operational mechanisms when engine speeds are outside of said predetermined range.

8. A control system for a cotton harvester, said cotton harvester having a mobile frame driven across a field by an engine operated at different speeds from an operator station, cotton harvesting means mounted on said frame for harvesting cotton, receptacle means for receiving cotton from said harvesting means, compactor means arranged within said receptacle means for compressing cotton received in the receptacle means, and fan means for developing an air flow for propelling harvested cotton from said harvesting means to said receptacle means, said control system comprising:

means for generating signals indicative of engine speed; and control circuitry means responsive to signals from said signal generating means for individually enabling operation of said cotton harvesting means, said compactor means, and said fan means as a function of engine speed, and wherein said control circuitry is configured to permit said harvesting means to be operated remote from said operator station.

* * * * *